(12) United States Patent
McBain

(10) Patent No.: US 9,878,802 B2
(45) Date of Patent: *Jan. 30, 2018

(54) SYSTEM AND METHOD FOR SELECTIVELY ENABLING A CONTROL SYSTEM FOR ACCESSING A CENTRAL PROCESSING UNIT

(76) Inventor: Theodore McBain, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/340,673

(22) Filed: Dec. 30, 2011

(65) Prior Publication Data

US 2012/0130563 A1  May 24, 2012

Related U.S. Application Data

(63) Continuation-in-part of application No. 11/955,085, filed on Dec. 12, 2007, now Pat. No. 8,138,951, which is a continuation of application No. 11/566,603, filed on Dec. 4, 2006, now abandoned, which is a continuation of application No. 10/251,666, filed on Sep. 19, 2002, now Pat. No. 7,145,477.

(60) Provisional application No. 60/323,754, filed on Sep. 19, 2001.

(51) Int. Cl.
*G08B 21/00* (2006.01)
*B64D 45/00* (2006.01)
*G06F 21/32* (2013.01)

(52) U.S. Cl.
CPC ......... *B64D 45/0015* (2013.01); *G06F 21/32* (2013.01); *B64D 2045/004* (2013.01); *B64D 2045/0055* (2013.01)

(58) Field of Classification Search
USPC ............ 340/945, 5.82, 5.83, 439, 575, 576; 701/14
See application file for complete search history.

(56) References Cited

U.S. PATENT DOCUMENTS

| 4,860,751 | A | * | 8/1989 | Callaghan | 607/16 |
| 5,686,765 | A | * | 11/1997 | Washington | 307/10.5 |
| 6,087,941 | A | * | 7/2000 | Ferraz | 340/575 |
| 6,734,799 | B2 | * | 5/2004 | Munch | 340/576 |
| 6,762,684 | B1 | * | 7/2004 | Camhi | 340/573.1 |
| 7,145,477 | B1 | * | 12/2006 | McBain | 340/945 |

(Continued)

*Primary Examiner* — Brent Swarthout
(74) *Attorney, Agent, or Firm* — Joshua Kaplan, Esq.; Kaplan Law Practice LLC

(57) ABSTRACT

A system and method are disclosed for selectively enabling a control system using a biometric and a physiological sensor to determine the status of an operator. An input component is operatively coupled to the sensor to permit an operator to initialize the sensor. A central processor unit is operatively coupled to the operator sensor and the central processor unit has a transceiver operatively coupled therewith for processing and evaluating the biometric and physiological information; A transceiver coupled with a remote ground control; an override operatively coupled to the ground control. Alternatively, the present invention comprises a security control center, which controls the operation of at least one biometric sensor and at least on physiological sensor; the security control center also capable of detecting said normal and said abnormal sensory reading and the central processing unit in response to said sensory reading.

18 Claims, 7 Drawing Sheets

(56) References Cited

U.S. PATENT DOCUMENTS

| | | | |
|---|---|---|---|
| 8,138,951 B2* | 3/2012 | McBain | 340/945 |
| 2001/0044588 A1* | 11/2001 | Mault | 600/549 |
| 2002/0105427 A1* | 8/2002 | Hamamoto et al. | 340/576 |
| 2009/0253406 A1 | 10/2009 | Fitzgerald | |
| 2010/0207721 A1 | 8/2010 | Nakajima et al. | |

* cited by examiner

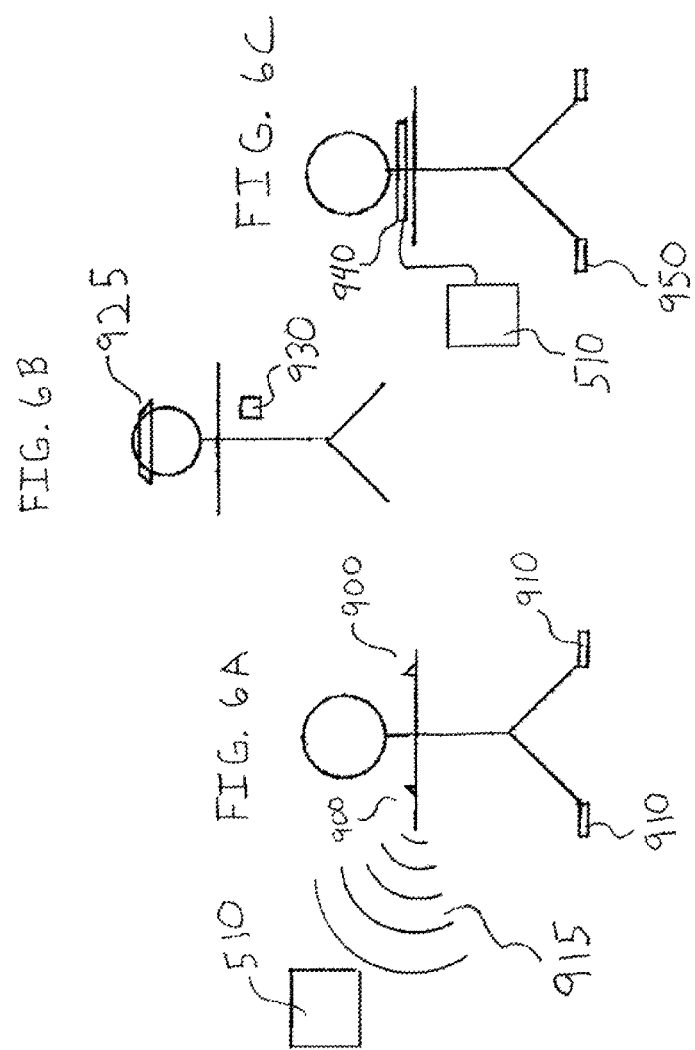

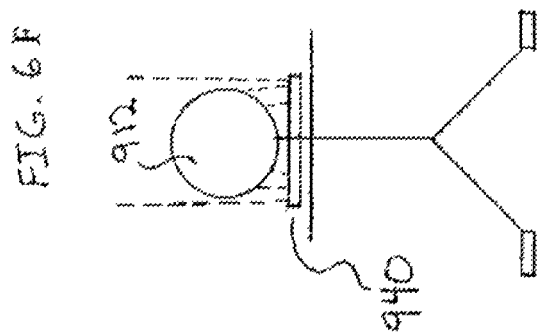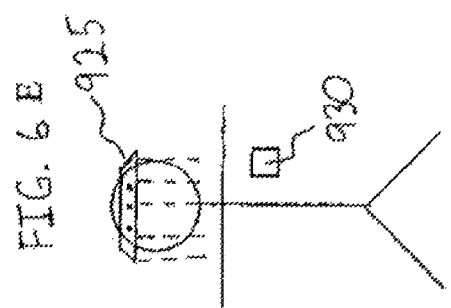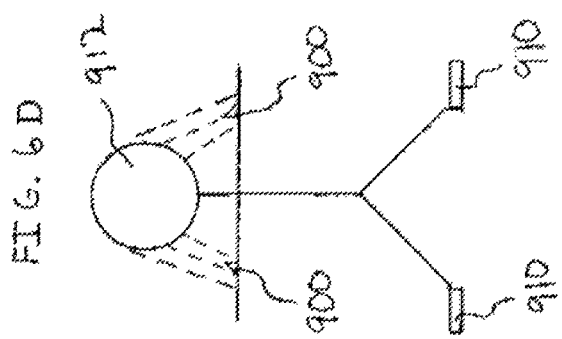

SYSTEM AND METHOD FOR SELECTIVELY ENABLING A CONTROL SYSTEM FOR ACCESSING A CENTRAL PROCESSING UNIT

CROSS-REFERENCE TO RELATED APPLICATIONS

This application is a Continuation in Part of a U.S. patent application Ser. No. 11/955,085, filed in Dec. 12, 2007, now U.S. Pat. No. 8,138,951, which is a continuation of the U.S. patent application Ser. No. 11/566,603, filed Dec. 4, 2006, now abandoned, which claims the benefit of U.S. patent application Ser. No. 10/251,666, filed Sep. 19, 2002, now issued as U.S. Pat. No. 7,145,477 and U.S. Provisional Application Ser. No. 60/323,754, filed Sep. 19, 2001, and expressly incorporates by reference the above-mentioned applications.

BACKGROUND

The present invention relates to the field of operator monitoring to safeguard security and dependability of sensitive, vital or vulnerable operations. In particular, the present disclosure relates to a sensor system that can be implemented in a plurality of circumstances.

The preset invention is a useful and novel solution to the issues with identity theft and piracy, plaguing multiple industries, in particular, the Information Technology industry. The accessibility of privileged information is becoming easier to obtain due to the failure of existing security systems. Millions of desktop computers, laptops, cellular phones and personal digital assistant devices are stolen annually in the United States alone, giving the thief an opportunity to steal any or all sensitive material within the device. The fact is, only a few key pieces of information are needed to steal personal identification information. This is a growing problem throughout the world. Although there the standard of user authentication are quite high and constantly improving, there is no current foolproof solution to authenticate one's identity. In addition, the ability of an individual to keep track of the numerous passwords, access codes and magnetic strip cards has already become unmanageable for most people.

The system disclosed in the present invention continuously verifies the owner/operator using the preprogrammed biometrics of the first original owner/operator stored within a communication device's secure data bank. The biometric and physiological systems continuously authenticate and identify the operator of a communication device. Input components are coupled to the operator sensors. A communication device is coupled to the operator sensors. The communication device central processing unit is coupled to the operator sensors. The communication device's central processing, unit is coupled to a transceiver. The transceiver is coupled to a communication provider. The communication device and communication device provider continuously authenticates the operator of the communication device.

This disclosed method is directed toward a method of operating a communication device. The authorized operator of a communication device's biometric and physiological parameters is recognized by the communication device's central processing unit coupled to stored authorized operator data. The method includes sensing biometric and physiological parameters of the operator of the communication device. The detected biometric and physiological parameters of the operator of the communication device are then compared with stored data to detect discontinuity between the biometric and physiological parameters between this new activity and stored data.

The method includes transmitting a signal to a central processing unit of a communication device, to notify it that a discontinuity exists and processing a signal in the central processing unit. The method includes activating a device's "Lock out System" allowing only an emergency signal to be sent from the communication device. The signal sent from the communication device reveals the location, condition and identification of an unauthorized operator. A signal may be sent from the service provider for the communication device to self-destruct all stored data on its central processing, unit.

One skilled in the art will be able to appreciate that the present invention can be used to secure multiple apparatuses, including but not limited to mobile phones, computers, hand-held organizers and global positioning devices, voting venues and devices used in voting, hospitals and healthcare industry, to ascertain the identity and operational fitness of taxi, truck, train or boat operators and their crews. It may also be able to secure vulnerable locations such as oil rigs and pipelines, hazardous material production and storage sites, airports, government buildings, public sport venues, etc.

In current aircraft, pilots and/or flight crews are vulnerable, to catastrophic events that may place the aircraft and all aboard the aircraft in jeopardy. Events, such as, physical mishaps and even terrorist attacks on the pilot and crew are possible. If the pilot, and crew capable of operating the aircraft become disabled, then the aircraft could be placed into peril. Also, if terrorists or hijackers disable the pilot, then they can take command of the aircraft and use it for their own sinister interests that may place others at risk of injury or even death. What is needed is a system that can prevent the risks of injury and even great tragedy due to the loss of a pilot or aircraft highjacking.

SUMMARY

The present invention is a system having an operator control of at least one performance parameter of the system, with at least one biometric sensor and at least one physiological sensor. A disclosed biometric, and physiological sensor operatively coupled with each other and with a central processing, unit. Furthermore, the disclosed biometric and physiological sensors capable of delivering a parallel a sensory reading to said central processing unit. The central processing unit also capable of detecting a normal or an abnormal sensory reading and initiating an action effecting a performance parameter of the system in response to the sensory reading. The sensor reading is then recorded on a storage medium to be used for future detection of normal or abnormal sensory readings.

In another embodiment the present invention comprises a security control center, which controls the operation of at least one biometric sensor and at least on physiological, sensor. Furthermore, the security control center also capable of detecting said normal and said abnormal sensory reading and the central processing unit in response to said sensory reading.

In another embodiment the disclosed device is directed towards enabling a control system. The system comprising at least one operator control affecting at least one performance parameter of the system, at least one biometric sensor, at least one physiological sensor and a central processor unit operatively coupled to the at least one biometric sensor, the at least one physiological sensor, and the at least one operator control. The central processor unit configured to confirm the identity of an operator from data obtained from the biometric sensor and to assess the condition of at least one physiological parameter exhibited by the operator from data obtained from the physiological sensor. The central processor unit configured to cause the at least one operator control to affect the at least one performance parameter of the system in response thereto.

The system may further comprise at least one biometric sensor and the at least one physiological sensor disposed in an operator garment. The operator garment comprises at least one glove or other apparel specimen having at least one finger print sensor, or a least one pulse monitor fingerprint scanner, a retina scanner, an iris scanner, a facial features scanner, a thermal detector, a voice sensor, a palm scanner, and a blood vessel scanner. The operator garment comprises a headset, a collar or specialized shoulder pads, having one of the disclosed sensors, including a brain activity sensor. A detachable electrical cable which operatively couples the operator garment and the central processor unit. The system may further include an input component for permitting initialization of the apparatus, wherein the input component is selected from the group consisting of a keypad, a video camera, a microphone, thermal imager, and a bar code reader.

In another variation, the invention is a method of altering at least one operator control comprising the steps of: activating an operator sensor device associated with the operator; sensing biometric parameters of the operator; sensing physiological parameters of the operator; comparing the sensed biometric and physiological parameters of the operator with one or more stored data; detecting a discontinuity between the sensed biometric and physiological parameters and the stored data; transmitting a signal to a central processor unit that the discontinuity exists: processing the signal in the central processor unit; altering at least one performance parameter of the at least one operator control in response to the discontinuity; and transmitting an emergency signal to a remotely located control center. The control center or the security control center may be located remotely or be located locally within the system.

It is an object of the present invention to provide an apparatus capable of continuously authenticating the operator utilizing biometric and physiological sensors.

Another object of the present invention is to create a device where all sensors are aware of each other's activities.

Yet another object of the present invention is to provide a universal authentication apparatus that is capable of being adapted to multiple industries with minimal customization.

BRIEF DESCRIPTION OF THE DRAWING FIGURES

Figure 5:
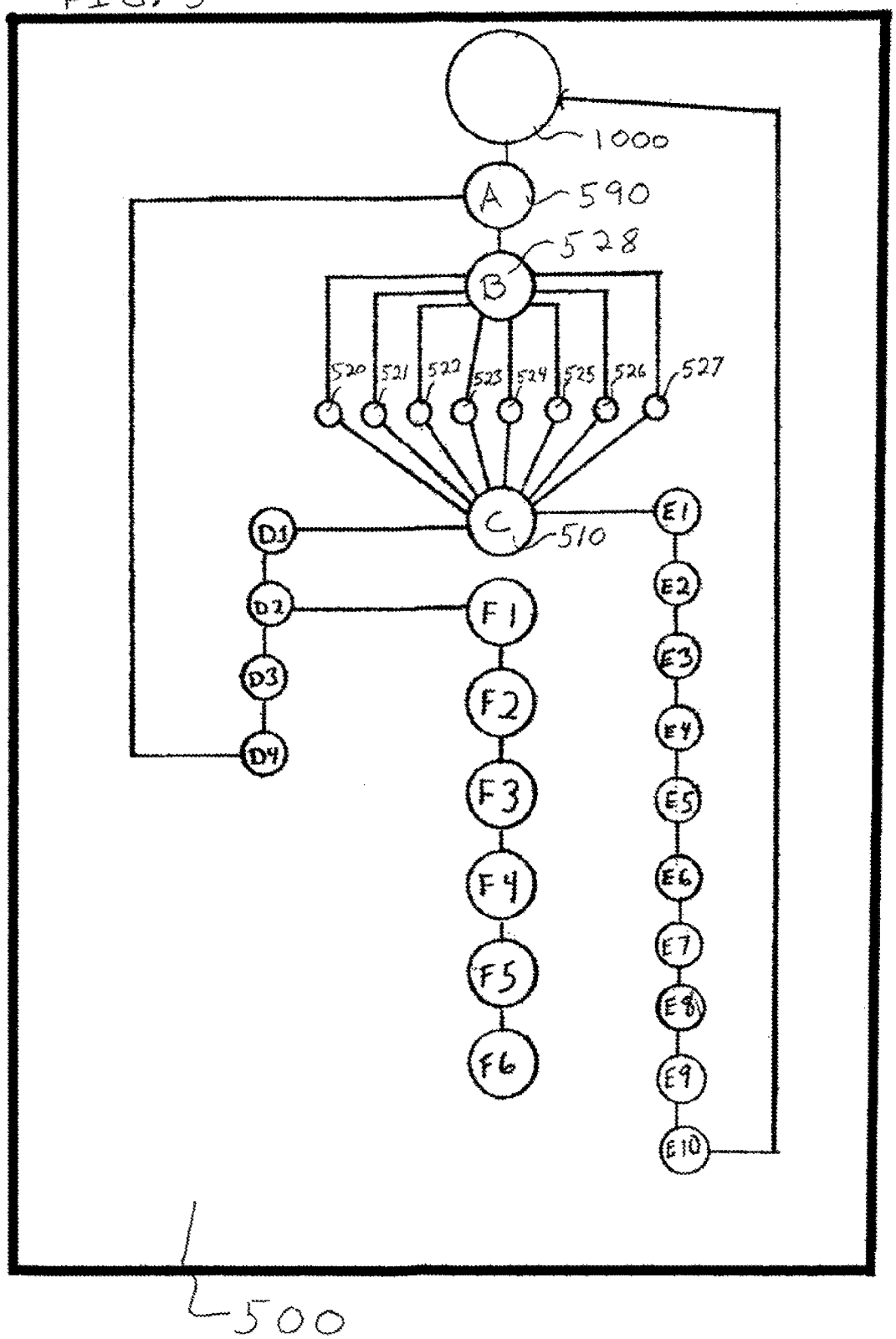
FIG. 5 is a diagram of the system and method claimed in the present continuation in part application.
Figure 5A:
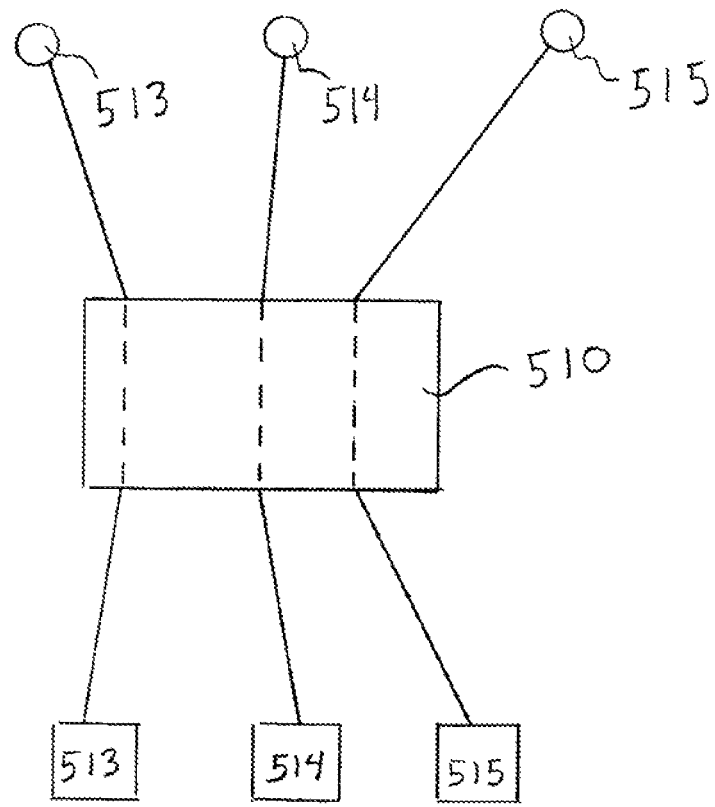
Figure 5B:
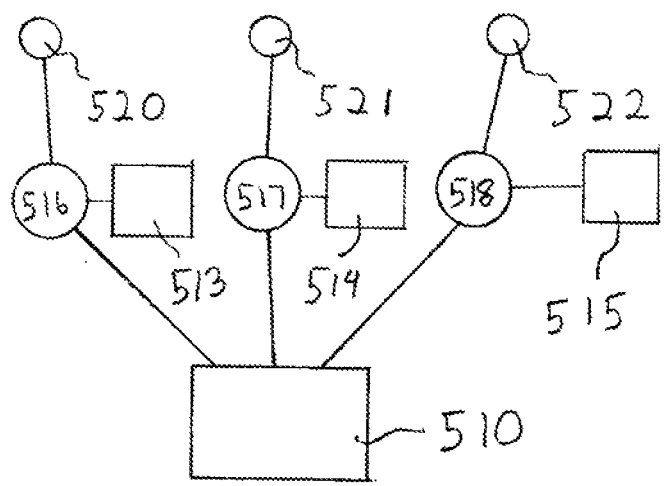

FIGS. 5A and 5B demostrate the physical layout of the present invention.

FIGS. 6A-6F show an operator wearing some of the sensors disclosed in the present invention.

DETAILED DESCRIPTION OF A PREFERRED EMBODIMENT

Persons of ordinary skill in the art will realize that the following description of the present invention is illustrative only and not in any way limiting. Other embodiments of the invention will readily suggest themselves to such skilled persons having the benefit of this disclosure.

Figure 1:
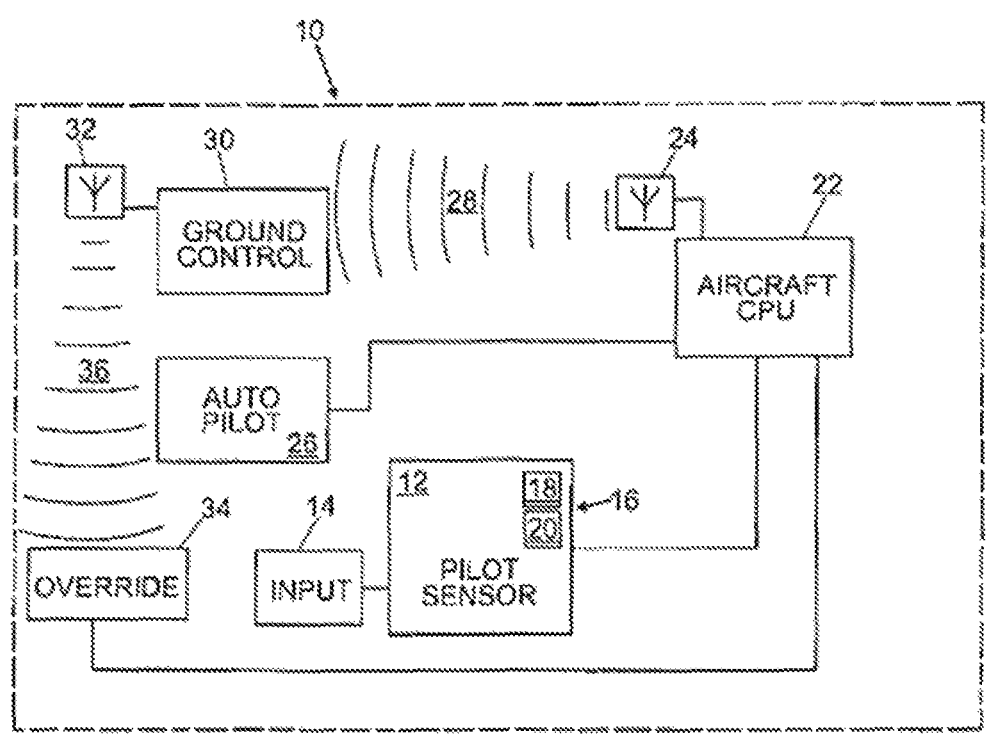
FIG. 1 is a schematic of an exemplary anti-terrorist aircraft pilot sensor system.

FIG. 1 illustrates a schematic of an exemplary anti-terrorist aircraft pilot sensor system, or simply, pilot sensor system 10. The pilot sensor system 10 includes a pilot sensor 12. The pilot sensor 12 is operatively coupled to an input component 14 that provides data input for activation and deactivation of the pilot sensor 12. For example, the input component 14 can be a keypad with alphanumeric keys that are configured to accept user inputs, such as, a code in order to activate or deactivate the pilot sensor 12. The input component 14 can also be audio or video, bar code reader, microphone, camera, thermal imager, eye retinal scanner or any combination thereof, for inputting a code to activate the pilot sensor 12. The pilot sensor 12 comprises a sensor or a plurality of sensors, 16 that sense various biometric and/or physiological information of at least one of a pilot and co-pilot of the aircraft. Fingerprints or eye retina patterns are non-limiting examples of biometric information sensed by the sensors 16. The sensors 16 can also measure physiological parameters, such as heart rate, blood pressure, pulse, and the like. The sensors 16 can be specific to the parameters sensed, such as a biometric sensor 18 or a physiological sensor 20. The biometric sensor 18 senses biometric parameters, such as, fingerprints, eye retina patterns, and the like. The physiological sensor 20 senses physiological parameters such as heart rate, blood pressure, pulse, or even adrenaline levels, and the like.

The pilot sensor 12 is operatively coupled to an aircraft central processor unit 22. The aircraft central processor unit 22 includes a processor, micro-processor and any combination thereof such that information can be processed, and programs can be executed. The aircraft control processor 22 also includes communication busses, memories, memory busses and input/output (I/O) circuitry such that information can be processed and signals transmitted and received. A transceiver 24 is operatively coupled to the aircraft central processor 22. Signals can be transmitted and received by wireless communication via the transceiver 24. The aircraft central processor 22 receives inputs from the pilot sensor 12 and operates certain functions based on the inputs from the pilot sensor 12. The aircraft central processor 22 is operatively coupled to the autopilot 26. The aircraft central processor 22 can perform the function of placing the aircraft on an autopilot control 26. Autopilot 26 is the automatic flight control of the aircraft along a flight path without pilot intervention. The aircraft central processor 22 can also perform the function of transmitting an emergency signal 28 to a ground control 30. The emergency signal 28 can include information vital to the safety of the aircraft, such as location, heading, altitude, aircraft system operating parameters, distress messages and the like. The aircraft central processor 22 can send the emergency signal 28 via the transceiver 24. The ground control 30 being operatively coupled to a transceiver 32 can also communicate with the aircraft central processor 22. In one embodiment, the ground control 30 can send and receive information to and from the aircraft central processor unit 22 in addition to the emergency signal 28. The aircraft operability conditions taken from instrumentation and controls, audio and video information within the cabin of the aircraft, and the like, can be provided to the ground control 30. The ground control 30 is also operatively coupled to an emergency override 34. The emergency override, or simply override. 34 can be activated to override certain functions of the aircraft, such as, the autopilot 26. An emergency override signal can be transmitted via wireless communications to the override 34 from the ground control 32 in order to deactivate the autopilot 26 and place the aircraft into manual flight control.

Figure 2:
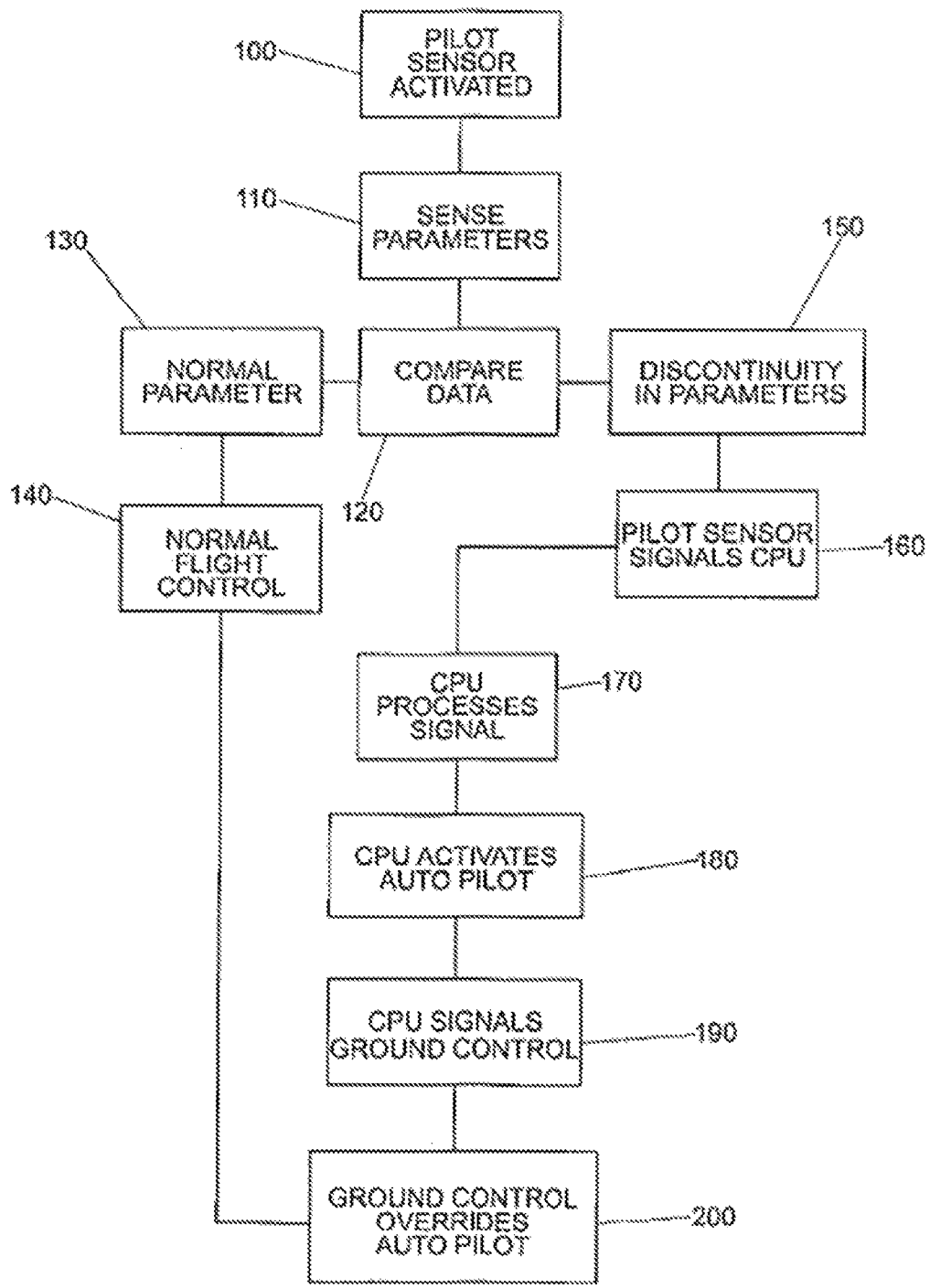
FIG. 2 is a flowchart of the operation of the exemplary anti-terrorist pilot sensor system.
Figure 3:
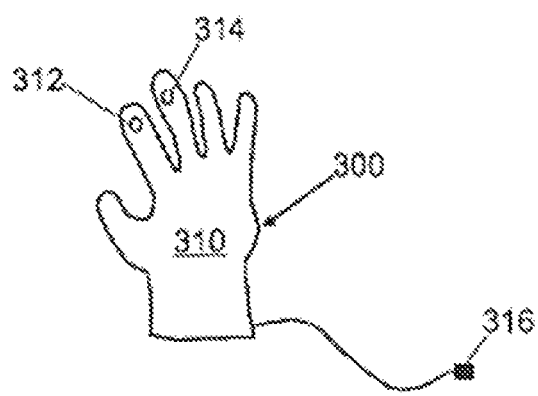
FIG. 3 is a diagram of an exemplary anti-terrorist aircraft pilot sensor glove.

Referring to FIG. 2, a flowchart of the operation of the exemplary anti-terrorist pilot sensor system is illustrated. The operation of the exemplary anti-terrorist pilot sensor system requires that the system be installed into an aircraft. With the system components in place, the pilot and/or the co-pilot, or any other crewmember that will take command of the aircraft can activate the system. For simplicity, and by no means limiting the scope of the invention, the pilot will be the primary user of the system. The pilot sensor is activated as shown in block 100. The pilot sensor is activated, when the pilot attaches the pilot sensor proximate to the pilots body, and the pilot then enters a code through the input component and the pilot sensor stores the code for future use during the flight or in other embodiments, other periods of time, such as a week, a month, and the like. The pilot sensor is activated with entry of the code. The pilot sensor senses the biometric and/or physiological parameters of the pilot, block 110, and compares the sensed data with a standard set of biometric and physiological parameters for the pilot stored in a memory as data. The biometric and physiological data of the user can also be stored in the aircraft central processor unit. The biometric parameters will be compared, block 120, to biometric parameters of the user, stored as data in a memory. If the biometric parameters are determined to be acceptable matches, then the pilot sensor remains activated. The acceptable matches indicate normal parameters, block 130, and a normal operating condition. Then the aircraft will remain in a normal flight control mode, block 140.

The pilot sensor can also monitor the physiological parameters of the user. Certain ranges of the physiological parameters will be stored in the memory. The physiological parameters can be associated with various external stimuli the pilot may experience. The pilot will have elevated heart rate due to being nervous scared. The pilot may have very low or no blood pressure in a case of pilot injury or death. The pilot sensor can monitor the biometric and physiological parameters of the pilot through the biometric sensors and physiological sensors. If any of the parameters fail to match the recorded parameters of the pilot that is compared from the memory then a discontinuity in the parameters exists, block 150. Upon sensing a discontinuity, the pilot sensor will send a signal to the aircraft central processor unit, block 160. The aircraft central processor unit will then perform a command and control process, block 170. If certain conditions are met, the aircraft central processor unit will send a signal to the autopilot device to activate the autopilot, block 180. The aircraft will then be flown on autopilot and manual control will be deactivated. The aircraft central processor will also send an emergency signal to ground control informing ground control of the conditions aboard the aircraft, block 190. If conditions aboard the aircraft are returned to a normal status, or the ground control determines a need, then override of the autopilot is available to the ground control. The ground control can send a command signal to the override that allows for manual control of the aircraft and deactivates the autopilot, block 200.

In an off normal condition, such as a terrorist attack on the pilot or even a health emergency of the pilot, the pilot will exhibit abnormal physiological parameters and/or the biometric sensor will sense that the biometric parameters are no longer acceptable matches and a discontinuity of the parameters exists (i.e. the pilot sensor has been detached from the pilot). The discontinuity of the biometric send the emergency signal 28 via the transceiver 24. The ground control 30 being operatively coupled to a transceiver 32 can also communicate with the aircraft central processor 22. In one embodiment, the ground control 30 can send and receive information to and from the aircraft central processor unit 22 in addition to the emergency signal 28. The aircraft operability conditions taken from instrumentation and controls, audio and video information within the cabin of the aircraft, and the like, can be provided to the ground control 30. The ground control 30 is also operatively coupled to an emergency override 34. The emergency override, or simply override, 34 can be activated to override certain functions of the aircraft, such as. the autopilot 26. An emergency override signal can be transmitted via wireless communications to the override 34 from the ground control 32 in order to deactivate the autopilot 26 and place the aircraft into manual flight control.

Referring to FIG. 2, a flowchart of the operation of the exemplary anti-terrorist pilot sensor system is illustrated. The operation of the exemplary anti-terrorist pilot sensor system requires that the system be installed into an aircraft. With the system components in place, the pilot and/or the co-pilot, or any other crewmember that will take command of the aircraft can activate the system. For simplicity, and by no means limiting, the scope of the invention, the pilot will be the primary user of the system. The pilot sensor is activated as shown it block proximate to at least one fingertip to sense a fingerprint. The physiological sensor 314, in one embodiment, can be located proximate to the wrist to sense a pulse. It is contemplated that the location of the sensors will depend on the type of sensor employed. A cord 316 can be coupled to the glove 310 to operatively couple the glove 310 to the aircraft central processor unit (not shown). The cord 316 can be adapted for connection and disconnection to the input component (not shown) or other peripherals, such as a power source, battery charger, aircraft systems, and the like.

Figure 4:
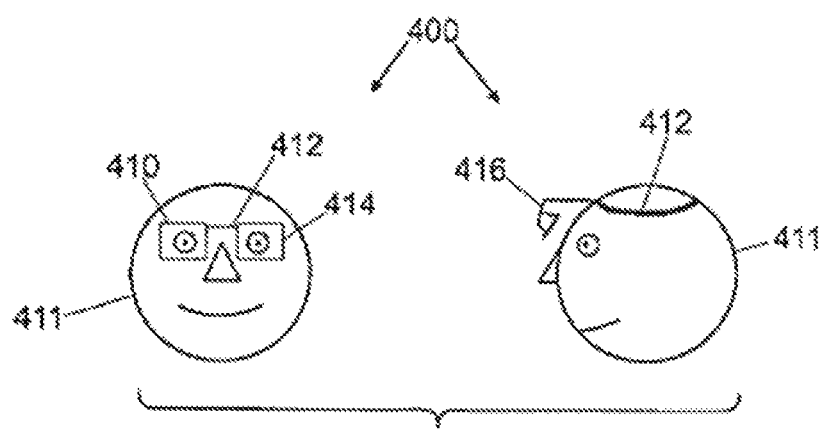
FIG. 4 is a diagram of an exemplary anti-terrorist aircraft pilot sensor headgear.

FIG. 4 illustrates another exemplary embodiment of the pilot sensor 400. The pilot sensor 400 is made up of a head set 410 worn on a pilots head 411, including at least one physiological sensor 412 and at least one biometric sensor 414. The biometric sensor 414 and the physiological sensor 412 can read directly into the eye. The biometric, sensor 414 can sense the eye retina pattern of the eye and the physiological sensor 412 can sense the pulse in the eye. In another embodiment, the physiological sensor 412 can be located along, the head or even near the neck to sense various physiological parameters. Included with the headset 410 can be the input component 416 that can receive a visual or video input from the pilot or in the cockpit. Other video or audio equipment can be employed in parts of the aircraft to provide information to control.

The alternative embodiment is described in FIG. 5. FIG. 5 is a schematic of the components that make up the Security Control Center 510 (SCC). The processes marked with B, D, E and F reference numbers are part of the SCC but have been exploded in FIG. 5 to add clarity. The schematic diagrams an apparatus that is used to monitor and limit access to the system by an operator 1000 that had overcome standard authentication mechanisms and who is now authorized to act to a computer system or any type of device, machinery, vehicle, boat or airplane, to authorized persons. The SCC enforces the authenticity and fitness of the operator to continue operating the system or machinery. The apparatus also ensures that the authorized operator is not under the influence of an undesirable or dangerous external stimuli, such as a hijacker or an unhealthy or a dangerous condition impacting the operator.

Shown in FIG. 5 is a system 500. The system 500 may be a computer system a vehicle, airplane, vessel, manufacturing or construction machinery. One skilled in the art will appreciate that the apparatus claimed in the present invention and method of implementing this apparatus can be adapted to multiple situations. The system 500 contains a plurality of sensors 520-527 activated by the component 528. The component 528 represents a step that activates all sensors 520-527. The component 528 may also deactivate these sensors. Component 528 may be a software process or a complex electrical switch which turns sensors 520-527 on and off. The sensors 520-527 may also be controlled directly by the security control center (SCC) 510 or by central processing unit (CPU). The CPU and the security control center 510 may be interchangeable or may be separate and distinct components depending on the embodiment. In the preferred embodiment the SCC is a software component while the CPU is a member of complex circuitry.

The sensors 520-527 may be operatively coupled with each other. Meaning that they are linked by the same data bus or same set of circuitry. The linkage can be wired, wireless, infrared, laser or any other linking or wiring technologies used in the art. This creates an environment were all sensors are working in parallel and the SCC or the sensors themselves are aware of each other's operational health. Such awareness can be anything from whether the sensor is turned on or turned off, to whether another sensor registered an anomalous sensory reading.

Alternatively, the SCC or the CPU 510 would record the data from different sensors 520-527 into different databases 513-515, and then read historical data from the same set of databases 513-515, as described in FIGS. 5A and 5B. In such a model it would make it much more difficult for an identity thief to break into multiple databases. In an extreme security mode, the there may be one central SCC referencing to multiple minor SCC. Each minor SCC 516-518 would be connected to a separate database and manage it's own individual sensor. In actuality, each minor SCC 516-519 may be a separate security company or silo as shown in FIG. 5B, with the central or master SCC 510 interpreting sensory readings from each minor SCC, and responding to each minor SCC with an appropriate action.

The coupling can be direct, where the sensors 520-527 are linked by the same data link or electrical cable, or indirect, where the component 528 or the SCC 10 or the CPU maintains the operational health and the alarm rate of each sensor 520-527. The sensors 520-527 include but are not limited to the following sensors: a fingerprint sensor 520, a retinal scanner 521, an iris scanner 522, a facial scanner 523, a thermal imager 524, a voice recorder 525, a palm scanner 526 and a blood vessel scanner 527. Alternatively, facial scanner 523 may be a brain activity sensor, or may include both functionalities. Additional or fewer sensors may be included in a particular embodiment.

The sensors 520-527 serve a dual purpose of authenticating the operator's identity and access entitlement and monitoring the operator's physical ability to be able to perform his or her functions. The authentication is accomplished by the sensors 520-527 collecting biometric information regarding the operator. For example data from the fingerprint scanner 520, or the retinal scanner 521, or the voice recorder 525, or a combination thereof is collected by the SCC 510 or by the CPU and compared against data stored on the storage medium. A typical storage medium may include, but is not limited to a relational database, a distributed database, an embedded database; a file-oriented database, or any combination of databases.

In an event where the sensory reading for this operator is different to what is contained in the database or if it is not found in the database, then the CPU will block the operator's access either completely or partially. For example, when the system 500 is a computer system, a blocked operator would not be permitted to access the interact or make system or data changes. In an embodiment where the system 500 is a piece of heavy construction equipment or an airplane, the system 500 would become unresponsive to unauthenticated operator, except for certain emergencies. Where necessary or possible, such as when a vehicle is on the road or when an airplane is in the air, SCC will signal for autopilot or a remote control center to engage, or will notify the authorities.

The same or different set of sensors 520-527 would be responsible for recording physiological data about the operator. The physiological data focuses on the operator's well being and general ability to perform required tasks. For example based on breath, voice, iris dilation, detected by the sensors, the SCC 510 would be able to detect dangerous impairing conditions, such as intoxication or heart attack. The capability of the sensors can be further expanded when reading for iris and retina activity, as well as heart beat and voice intonations would detect fright or disorientation. These sensory readings may indicate that the operator is not sure of his or her actions—he/she has lost direction or coordinates, or is working under severe stress caused by an external condition. Fear may be induced by the presence of a hijacker in the cockpit of an airplane or the cabin of a vehicle. Fear and disorientation may also be induced by a health condition of the operator, be brought about through a reaction to medication or may indicate that the operator is not sure of his or her actions. In all of these cases, the SCC 510 will direct the CPU to either block some of the operator controls available to the operator, report the condition to an overseeing party or law enforcement or go into override mode.

FIG. 5 illustrates the various internal actions or processes of that make up the activity of SCC 10. The sensors 520-527 remain in an activated state unless deliberately turned off. If the sensory reading results in a normal biometric and/or physiological rating then in E2 the CPU makes some critical process of the system 500 accessible to the operator. Some examples of a critical process include, but are not limited to access to the internet, being able to process data and edit files, being able to login into a computer system, or activating a motor of mechanical machinery. At the same time, the SCC 510 continues to monitor the operator's identity, actions and vital signs. In step E3, one or more of the sensors 520-527 sends a sensory reading to the CPU and the CPU processes the signal. Steps E4 and E5 continuously refresh the sensors 520-527 and ensure that they are in proper working order and that the sensory readings are not stale.

If a sensory reading that was interpreted by the CPU turned out to be anomalous, step E7 is activated. E7 tries to prevent false negatives by having the CPU immediately request verification of the sensor's operational status from E4 and E5 and a follow up with a confirmatory sensory reading in E7. If the anomaly is confirmed, the emergency control E8 signals the CPU to activate emergency response systems E9. The emergency response system E9 tries to confirm the operator's identity using the last biometric reading or operator's condition using the last physiological reading. E9 attempts to identify the operator by comparing biometric data to data saved on a storage media. It may also attempt to reach out to the operator or to a contact listed in the SCC 510 as the supervising authority.

The SCC 510 may also contain alerting levels where alarm threshold can be fine tuned to a particular setting. For example, in mission critical systems or in settings where accidents may result in loss of life, the SCC may be set to the highest alerting threshold with maximum frequency of sensory sampling and minimum degree of excepted deviation. In another setting, such as a personal computer, the user would only want to know if the operator is authorized, his or her vitality may be irrelevant. In another mode, the SCC 510 would be capable of evaluating the condition, including my external condition, of an operator who triggered an anomalous sensory reading to grant limited access in an emergency situation.

In E10, the SCC 510 makes a decision to either continue to permit the operator's activity, severely restrict it, or to prevent it altogether. E10 also determines whether the operator should be blocked or hot listed. Such hot listing could only be overcome with a manual override by the SCC 510, as part of step D4, or may be overridden in an emergency if such configuration exists. The hot listing occurs when a system entry is made to disable operator's access to some degree or completely by either disabling an authentication key, by storage media, or in other ways known in the art. In an instance where an operator's account has been hijacked SCC may preserve the operator's access, but may hot list the biometric reading of the rogue operator.

The steps of D1-D4 function as intermediary messengers between the SCC's steps E1-E10 and the CPU of the system 500. D1 is the process that detects abnormalities in the signal sent by E3, by either comparing current sensory reading data to sensory reading data on record, or by comparing; sensory reading data against accepted levels, or a mixture of the two. D2 relays abnormal parameters back to the requesting process in the SCC, such as E7. D3 instructs the CPU on the action to be taken based on the decision reached in E10. D4 then resets the sensors 520-527 for the next reading and brings them to a starting point A (590), which is a pristine error free state.

Processes F1-F6 are background cleanup and maintenance processes of the SCC 510. F1 records the sensor readings on a storage media and creates parameters and benchmarks based on these recordings. F2 responds to SCC 510's requests for parameters and recorded data. F3 alerts the operator of the action taken in step E10, such as a warnings and excess denied errors. F4 records credentials of the blocked or hot listed operator on a storage media. F5 then implements SCC's response in E10.

The SCC may be implemented as a software utility using high level languages, such as but not limited to Java, C#, or C++. As a software utility SCC may be able to run within a native library structure of an operating, system such as Windows, MAC OS, or UNIX, or may be build within a commercially available framework, such as but not limited to .Net, Websphere, Weblogic or Tuxedo.

The SCC 510 may be implemented as an organized set of relay switches and electrical circuits. In such an embodiment an operator may be granted access based on sensory reading.

Such an embodiment may be more suitable in a rugged setting, such as but not limited to construction equipment, railroad, or mining equipment. The SCC in such a setting may be software or an amalgamation of circuits capable of making decisions based on input received from sensors 520-517.

FIG. 6A demonstrates shoulder mounted sensor array 900. The sensors within the array 900 may be the ones referred to above as items 20-27 or may be other sensors. The shoulder mounted sensor array 900 may include a microphone, speakers, and a communication device. Such a communication device enables an operator to send and receive audible communication, including commands, to and from SCC, or to communicate with a remote location through the SCC. The power for the shoulder mounted sensor array 900 can come from a power source disposed in operator's shoes 910, or any where else on the operator's garments or with the sensors themselves. The power source may be a battery or may connect directly to the CPU of the system 5 (FIG. 5). In the embodiment disclosed in FIG. 6A, the power source is comprised of a rare earth magnet surrounded by field coil. The alignment of the magnet and the field coil is such that each step by the operator causes the magnet to pass through the field coil, thus generating electric current. The power source may be a combination current produced by the rare magnet and a battery powered backup. The sensor array 900 transmits sensory readings via a wireless connection to a receiver on the SCC 10. A typical wireless signal may be sent using, radio waves or any other wireless connection known in the art. An alternative is to use a direct wired connection to the SCC 10, as shown in FIG. 6C.

FIG. 6B demonstrates a sensor that part of a headgear 925. The headgear may be a cap, a hat or a sweat band. Such a headwear may be outfitted with an array of sensors, such as a retinal scanner, an iris scanner, a facial scanner, a thermal imager, a voice recorder, an electroencephalographical (EEG) sensor or a sensor measuring brain activity. The power pack and communication circuitry may be enclosed with a device 930 or may be placed directly into the head wear.

FIG. 6C shows a sensor array within a collar 940. The collar 940 may be integrated into a shirt or vest collar of a uniform. Shoe mounted power source, as shown in FIG. 6A, supplies current necessary to enable a sensor array.

FIGS. 6D-6F lather demonstrate the apparel sensors. The power source shoe 910 can function as chargers that are capable of recharging the shoulder sensor array 900, or may have interchangeable batteries as well as a hard wired plug connector. The sensors in FIG. 6D are directed upwardly towards the skull 912. The sensors in the sensor array 900 will have thermal, facial, vein, infrared brain sensors, and all other biometric and physiological with to separate power source for each sensor. It may also be used as a communication device with voice, eye movement, and brain sensors interpreting thought processes enabling communications with computers and other people. FIG. 6E has all of what 6D has, but sensors are attached to a band 925, hat or helmet apparatus with sensors connected to skull as well as having a downward direction associated with other sensors. FIG. 6F is similar to FIG. 6D, except the sensor array is in the collar device 940 with sensors facing in an upward direction toward the scull 912 as well as the focusing onto the neck area itself.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An apparatus comprising a system having an operator control of at least one performance parameter of the system; at least one biometric sensor; at least one physiological sensor; said at least one biometric sensor and said at least one physiological sensor operatively coupled with each other and with a central processing unit, wherein said at least one biometric sensor and said at least one physiological sensor are aware of a sensory detection activity and an operational state of at least one other biometric sensor or at least one other physiological sensor; said at least one biometric sensor and said at least one physiological sensor delivering in parallel a sensory reading to said central processing unit; wherein sensory reading from said at least one physiological sensor or said at least one biometric sensor is compared against said at least one other biometric sensor or said at least one other physiological sensor or wherein sensory reading from said at least one physiological sensor or said at least one biometric sensor is compared against a historic data from said at least one biometric sensor or said at least one physiological sensor by said central processing unit, resulting in said central processing unit ability of detecting a normal or an abnormal sensory reading or an anomalous sensory reading between said physiological sensors and between said biometric sensors; said central processing unit capable of effecting said at least one performance parameter in response to said to said sensory reading; and said central processing unit recording said sensory reading on a storage medium to be used for future detection of said normal or said abnormal sensory readings.

2. The apparatus of claim 1, further comprising a security control center; said security control center controlling operation of said at least one biometric sensor and said at least on physiological sensor; said security control center capable of detecting said normal and said abnormal sensory reading; and said security control center capable of directing said central processing unit in response to said sensory reading.

3. The apparatus of claim 2, wherein said operative coupling of said at least one biometric sensor or said at least one physiological sensor is wireless.

4. The apparatus of claim 1, wherein said operator control is continuous.

5. The apparatus of claim 1, wherein said at least one biometric sensor or said at least physiological sensor are capable of monitoring external stimuli impacting an operator performance.

6. The apparatus of claim 2, wherein said at least one biometric, sensor or said at least physiological sensor are capable of monitoring external stimuli impacting an operator performance.

7. The apparatus of claim 1, wherein said at least one physiological sensor or said one biometric sensor is infrared.

8. The apparatus of claim 1, wherein said at least one physiological sensor or said at least one biometric sensor is a laser beam.

9. The apparatus of claim 1, wherein said at least one physiological sensor and said at least one biometric sensor is a comprised of a fingerprint scanner, a retina scanner, an iris scanner, a facial features scanner, a thermal detector, a voice sensor, a palm scanner, and a blood vessel scanner.

10. The apparatus of claim 1, wherein said at least one physiological sensor and said at least one biometric sensor is a brain activity sensor.

11. The apparatus of claim 1, wherein said physiological sensor and said at least one biometric sensor are powered by physical activity of the operator.

12. The apparatus of claim 2, wherein said operator control is a lockout of said operator, and wherein said sensory reading for said operator are recorded on a hot list.

13. The apparatus of claim 2, wherein said security control center is capable of evaluating a given condition of said operator for the purpose of granting limited access to said system.

14. The apparatus of claim 2, wherein said at least one physiological sensor and said at least one biometric sensor is a comprised of a fingerprint scanner, a retina scanner, an iris scanner, a facial features scanner, a thermal detector, a voice sensor, a palm scanner, and a blood vessel scanner.

15. The apparatus of claim 2, wherein said at least one physiological sensor and said at least one biometric sensor is a brain activity sensor.

16. The apparatus of claim 2, wherein said physiological sensor and said at least one biometric sensor are powered by physical activity of the operator.

17. The apparatus of claim 1, wherein said at least one physiological sensor or said at least one biometric sensor is an article of clothing.

18. The apparatus of claim 1, wherein said storage medium is further, comprised of different databases, wherein said different databases receiving data from said central control center, wherein said data comprising data received from said at least one biometric sensor or said at least one physiological sensor.

* * * * *